Dec. 28, 1965 — L. T. GARNETT ET AL — 3,226,474
CAPACITANCE PROBE ASSEMBLY
Filed Jan. 28, 1963
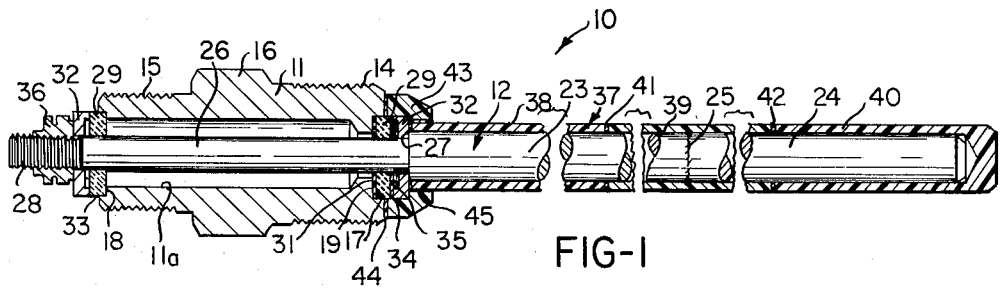
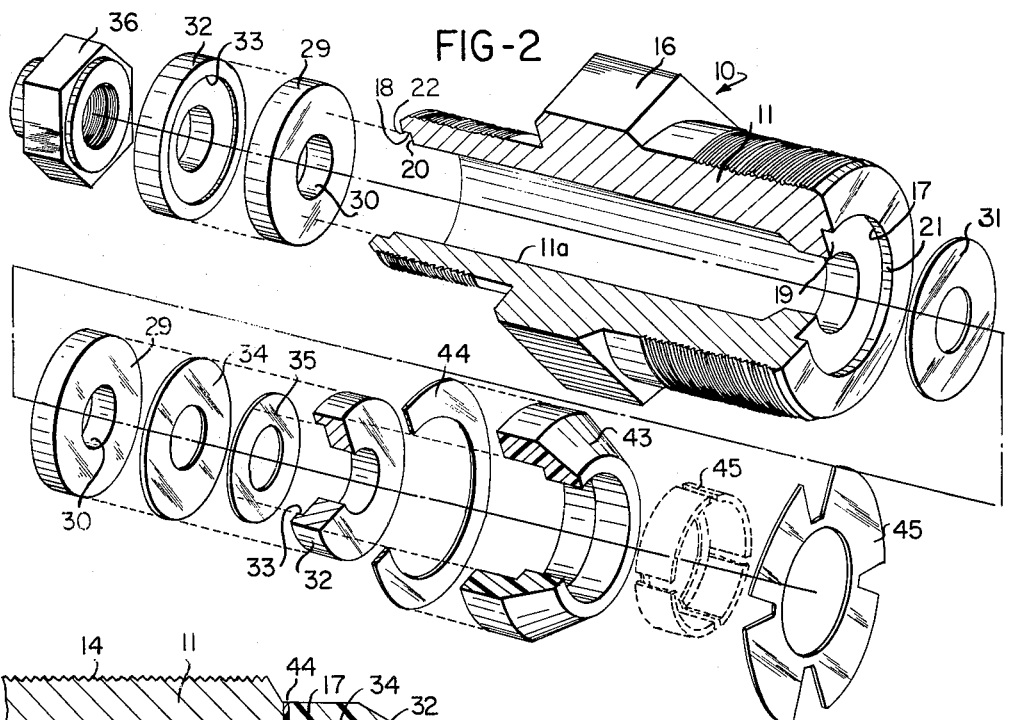
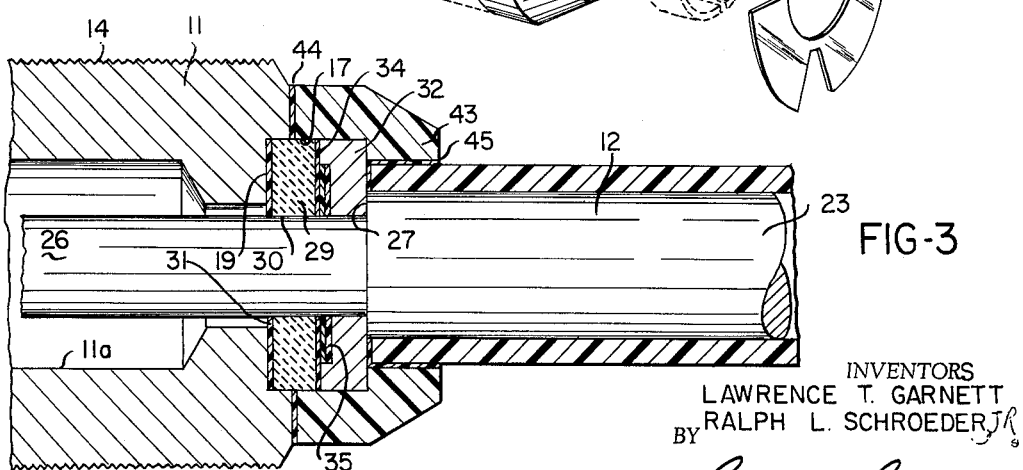
INVENTORS
LAWRENCE T. GARNETT
BY RALPH L. SCHROEDER, JR
THEIR ATTORNEYS United States Patent Office 3,226,474
Patented Dec. 28, 1965

3,226,474
CAPACITANCE PROBE ASSEMBLY
Lawrence T. Garnett, Fullerton, and Ralph L. Schroeder, Jr., Monrovia, Calif., assignors to Robertshaw Controls Company, a corporation of Delaware
Filed Jan. 28, 1963, Ser. No. 254,379
7 Claims. (Cl. 174—151)

This invention relates to an improved capacitance probe assembly or the like as well as to an improved method for making such an assembly or the like.

In general, a capacitance probe assembly comprises a hollow gland body telescopically receiving part of a probe rod, the probe rod being insulated from the gland body and the gland body being adapted to be readily attached to a vessel or the like.

In the past, such a probe rod was insulated from the gland body by Teflon insulators. However, it was found that coaxial and radial loads on the assembly from pressure in the vessel, probe weight, agitation of vessel contents, etc., caused a cold flow of the Teflon insulation, whereby an eventual gland leakage resulted. Further, because the cold flow of Teflon increases in rate with increasing temperatures, the pressure rating of such a prior known probe assembly was downgraded at higher temperatures.

However, according to the teachings of this invention, an improved capacitance probe assembly or the like is provided wherein the coaxial and radial loads from pressure in the vessel, probe weight, agitation of vessel contents, etc., are carried by insulators of high compressive strength in a manner hereinafter described, whereby the use of Teflon as a mechanical constraint is avoided so that no cold flow problems exist in the probe assembly of this invention.

Accordingly, it is an object of this invention to provide an improved capacitance probe assembly or the like having one or more of the novel features set forth above or hereinafter shown or described.

Another object of this invention is to provide an improved method of making such a probe assembly or the like.

Other objects, uses and advantages of this invention are apparent from a reading of this description, which proceeds with reference to the accompanying drawings forming a part thereof and wherein:

FIGURE 1 is a cross-sectional view of a capacitance probe assembly of this invention.

FIGURE 2 is an exploded broken-away view of various parts of the probe assembly of FIGURE 1.

FIGURE 3 is an enlarged, fragmentary cross-sectional view of the probe assembly illustrated in FIGURE 1.

While the various features of this invention are hereinafter described as being particularly adaptable for forming a capacitance probe assembly, it is to be understood that the various features of this invention can be utilized singly or in any combination thereof to provide other assemblies as desired.

Therefore, this invention is not to be limited to only the embodiment illustrated in the drawings, because the drawings are merely utilized to illustrate one of the wide variety of assemblies of this invention.

Referring now to FIGURE 1, an improved capacitance probe assembly or the like of this invention is generally indicated by the reference numeral 10 and generally comprises a hollow gland body 11 telescopically receiving part of a probe rod 12.

The gland body 11 can be formed of any suitable material, and, in the embodiment illustrated in the drawings, the gland body 11 is formed of 316 Stainless Steel and has a bore 11a passing therethrough. The gland body 11 has externally threaded ends 14 and 15 separated from each other by a hexagonal nut section 16 to facilitate threading the end 14 of the probe assembly 10 into a suitable threaded aperture of a vessel or the like of which the probe assembly 10 is to measure liquid level or other information.

The opposed ends 14 and 15 of the gland body 11 are provided with annular recesses 17 and 18, annular recesses 17 and 18 being formed by counter boring the ends 14 and 15 of the gland body 11 to define annular axial shoulders 19 and 20 and annular radial shoulders 21 and 22 for a purpose hereinafter described.

The probe rod 12 can also be formed of 316 Stainless Steel or the like and can be formed of a single piece or several pieces as desired. For example, when the effective length of the probe rod 12 is approximately ten feet or the like, the same can be made of two parts 23 and 24 secured together at a joint 25 by resistant butt or shield arc welding or the like.

The entire probe rod 12 includes a reduced portion 26 defining an annular shoulder 27 with the unreduced portion thereof, the reduced portion 26 of the probe rod 12 being adapted to be telescopically received in the bore 11a of the gland body 11, whereby the probe rod 12 extends beyond the opposed ends 14 and 15 of the gland body 11. The free end 28 of the reduced portion 26 of the probe rod 12 is externally threaded for a purpose hereinafter described.

The reduced portion 26 of the probe rod 12 is supported within the gland body 11 by a pair of washer-like insulators 29 each having a bore 30 passing therethrough to snugly receive the reduced portion 26 of the probe rod 12. The insulators 29 are so constructed and arranged that the same are adapted to be fully received in the annular recesses 18 and 19 of the gland body 11 in the manner illustrated in FIGURES 1 and 3, whereby the insulators 29 not only electrically insulate the probe rod 12 from the gland body 11, but also the insulators 29 mechanically constrain the probe rod 12 from the gland body 11 as the insulators 29 both radially and axially engage the gland body 11.

While the insulators 29 can be formed of any suitable material, the embodiments thereof illustrated in the drawings are formed of ceramic material, such as sintered alumina, known as Allite, manufactured by the U.S. Stoneware Company.

Such ceramic insulators have a high compressive strength to absorb coaxial and radial loads on the probe rod 12 due to pressure in the vessel, probe weight, agitation of vessel contents, etc.

The right hand washer 29 is adapted to be heat sealed to the annular shoulder 19 of the gland body 11 by a sealing washer 31 formed of a copolymer of tetrafluoroethylene and hexafluoropropylene sold under the trademark "FEP Teflon" by E. I. du Pont de Nemours, of Wilmington, Delaware.

A pair of thrust washers 32 of 316 Stainless Steel or the like are adapted to be telescopically received on the reduced portion 26 of the probe rod 12 and be disposed outboard of the insulators 29 in the manner illustrated in FIGURE 1 to impose an axial force on the insulators 29 to maintain the same in axial engagement with the shoulders 19 and 20 of the gland body 11.

Since the insulators 29 are generally weak in all but true compression thereof, the thrust washers 32 are undercut at 33 adjacent the insulators 29 to minimize or substantially eliminate any tensile or binding loads on the insulators 29.

If desired, the right hand thrust washer 32 can be initially silver brazed with the shoulder 27 of the probe rod 12, while the left hand thrust washer 32 is loosely disposed on the reduced portion 26 of the probe rod 12 for a purpose hereinafter described.

The right hand insulator 29 is adapted to be heat sealed to the right hand thrust washer 32 by a washer-like film 34 formed of the same material as washer 31. Similarly, the undercut portion 33 of the right hand thrust washer 32 is adapted to be filled with a washer 35 formed of the same material as washer 31, as illustrated in FIGURE 2, or a plurality of washers 35, in the manner illustrated in FIGURE 3, whereby the thrust washer 32 is adapted to be heat sealed to the respective insulator 29.

In order to assemble the probe rod 12 to the gland body 11, the parts are disposed in the position illustrated in FIGURE 1 and a suitable nut 36 is threaded on the threaded end 28 of the probe rod 12 and is tightened thereon to cause the thrust washers 32 to move axially inwardly toward the gland body 11 to stack the gland body 11, insulators 29 and thrust washers 32 between the annular shoulder 27 on the probe rod 12 and the nut 36 to hold the assembly together.

Thereafter, or before, a sleeve 37 of polytetrafluoroethylene sold under the trademark "TFE Teflon" by E. I. du Pont de Nemours, of Wilmington, Delaware, is adapted to be disposed over the unreduced portion of the probe rod 12 in the manner illustrated in FIGURE 1. If desired, the sleeve 37 can comprise a plurality of parts 38, 39 and 40 heat sealed together by film 41 and 42 formed of the same material as washer 31 as illustrated in FIGURE 1.

A seal 43 formed by the same material as sleeve 37 is adapted to be disposed over the right hand insulator 29 and its cooperating thrust washer 32 in the manner illustrated in FIGURES 1 and 3 and be heat sealed to the end 14 of the gland body 11 by a washer 44 formed of the same material as the washer 31.

In addition, the seal 43 is adapted to be heat sealed to the right hand thrust washer 32 and to the sleeve 37 by a washer 45 formed of the same material as washer 31 originally shaped in the form illustrated in full lines in FIGURE 2 and subsequently folded to the position illustrated in dotted lines in FIGURE 2 to cooperate with the right hand thrust washer 32 and the seal 43.

After all the parts have been assembled and heat sealed together in a manner previously described, the gland end of the probe assembly 10 is adapted to be finally sealed by dipping of the same in an insulating varnish, the varnish being subsequently baked thereon. This final sealing prevents breathing of the gland portions of the assembly 10 and excludes moisture and other gases which might affect gland capacitance or leakage resistance.

Therefore, it can be seen that an improved capacitance probe assembly or the like is provided by this invention, as well as an improved method of making the same or the like.

In addition, it can be seen that the gland body 11 can be formed from a single piece for a low-cost production thereof.

Also, the binding of the various parts of this invention by the use of the thermoplastic seals effects a pressure seal that permits the seal insulation to be utilized for its non-wetting characteristic, its general corrosion resistance, its high and low temperature limits, and its temperature invariant dielectric constant.

The air spaces within the gland body 11 are used as insulators when possible to minimize gland capacitance.

Therefore, this invention provides an improved capacitance probe assembly having many novel features as set forth above.

This invention also provides an improved method of making such a capacitance probe assembly or the like.

While the form of the invention now preferred has been disclosed as required by the statutes, other forms may be used, all coming within the scope of the claims which follows.

What is claimed is:

1. A capacitance probe assembly or the like comprising a probe rod, a hollow gland body telescopically receiving an intermediate part of said probe rod whereby said probe rod extends beyond the opposite ends of said gland body, a pair of insulators carried by said probe rod and radially and axially engaging said gland body, said insulators electrically insulating said probe rod from said gland body and mechanically constraining said probe rod, a pair of thrust washers disposed respectively against said insulators, and means imposing an axial force on said washers to place said insulators into axial engagement with said gland body, said washers being undercut adjacent said insulators to minimize tensile loads on said insulators.

2. A capacitance probe assembly or the like comprising a probe rod having a reduced portion defining a shoulder, a hollow gland body telescopically receiving an intermediate part of said reduced portion of said probe rod whereby said reduced portion extends beyond the opposed ends of said gland body, said ends having annular recesses provided therein, a pair of insulators carried by said probe rod and received in said recesses to radially and axially engage said gland body, a pair of thrust washers carried by said reduced portion outboard of said insulators, and a nut threadedly carried on the end of the reduced portion of said probe rod to stack said gland body, insulators and washers between said shoulder and said nut.

3. A capacitance probe assembly or the like as set forth in claim 2 wherein a seal is disposed over one of said pairs of cooperating insulators and washers.

4. A capacitance probe assembly or the like as set forth in claim 3 wherein said seal is heat sealed to said gland body.

5. A capacitance probe assembly or the like as set forth in claim 2 wherein said seal is heat sealed to one of said thrust washers.

6. A capacitance probe assembly or the like as set forth in claim 2 wherein a sleeve is disposed over the non-reduced portion of said probe rod and is heat sealed to said seal.

7. A capacitance probe assembly or the like as set forth in claim 6 wherein said sleeve is heat sealed to one of said thrust washers.

References Cited by the Examiner

UNITED STATES PATENTS

| | | | |
|---|---|---|---|
| 1,941,397 | 12/1933 | Grier | 174—53 |
| 2,356,831 | 8/1944 | De Monte et al. | 174—153 |
| 2,439,841 | 4/1948 | Carsten et al. | 174—88 |
| 2,442,545 | 6/1948 | Koch et al. | 174—152 |
| 2,617,850 | 11/1952 | Carmichael | 174—18 |
| 2,924,467 | 2/1960 | Burch. | |
| 2,957,041 | 10/1960 | Ziegler | 174—77 X |
| 2,996,568 | 8/1961 | Hany | 174—77 X |
| 3,047,801 | 7/1962 | Dietert | 317—246 X |
| 3,055,972 | 9/1962 | Peterson | 174—151 |
| 3,109,882 | 11/1963 | Maltby | 174—151 |

OTHER REFERENCES

Parbrook, "Insulated Electrical Leads Into Pressure Vessels," Journal of Scientific Instruments, vol. 30, February 1953, page 57.

JOHN F. BURNS, *Primary Examiner.*

JOHN P. WILDMAN, E. JAMES SAX, *Examiners.*